(12) United States Patent
Snyder

(10) Patent No.: US 7,374,593 B2
(45) Date of Patent: May 20, 2008

(54) PARTICLE SEPARATOR FOR A GAS TURBINE ENGINE

(75) Inventor: Philip Harold Snyder, Avon, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 11/607,567

(22) Filed: Dec. 1, 2006

(65) Prior Publication Data

US 2007/0095033 A1 May 3, 2007

Related U.S. Application Data

(63) Continuation of application No. PCT/US2006/024055, filed on Jun. 20, 2006.

(60) Provisional application No. 60/692,430, filed on Jun. 20, 2005.

(51) Int. Cl.
*B01D 45/00* (2006.01)

(52) U.S. Cl. .............. 55/440; 55/306; 55/307; 55/396; 55/397; 55/441; 95/267

(58) Field of Classification Search ............ 55/306, 55/307, 396, 397, 398, 440, 441; 95/267
See application file for complete search history.

(56) References Cited

U.S. PATENT DOCUMENTS

| | | | |
|---|---|---|---|
| 2,931,460 A * | 4/1960 | McEachern et al. .......... 55/306 |
| 3,368,332 A | 2/1968 | Hooper et al. |
| 3,421,296 A | 1/1969 | Beurer, Sr. |
| 3,449,891 A | 6/1969 | Shohet et al. |
| 3,465,950 A | 9/1969 | Freid et al. |
| 3,513,641 A | 5/1970 | Hopper et al. |
| 3,521,431 A | 7/1970 | Connors et al. |
| 3,534,548 A | 10/1970 | Connors |
| 3,616,616 A | 11/1971 | Flatt |
| 3,673,771 A * | 7/1972 | Dickey .................. 55/306 |
| 3,766,719 A | 10/1973 | McAnally, III |
| 3,778,983 A * | 12/1973 | Rygg ..................... 55/306 |
| 3,832,086 A | 8/1974 | Hull, Jr. et al. |
| 3,978,656 A * | 9/1976 | Murphy ............... 60/39.092 |
| 3,993,463 A | 11/1976 | Barr |
| 4,198,219 A | 4/1980 | Krisko |
| 4,265,646 A | 5/1981 | Weinstein et al. |
| 4,268,284 A | 5/1981 | Kent et al. |
| 4,509,962 A | 4/1985 | Breitman et al. |
| 4,527,387 A | 7/1985 | Lastrina et al. |

(Continued)

FOREIGN PATENT DOCUMENTS

GB 2270481 * 3/1994

*Primary Examiner*—Duane Smith
*Assistant Examiner*—Sonji Turner
(74) *Attorney, Agent, or Firm*—Krieg DeVault LLP; Matthew D. Fair

(57) ABSTRACT

A particle separator for separating particles and/or materials entrained in a flow of air is disclosed. The particle separator includes an annular inlet defined by an outer shroud and an inner shroud. An upper forward flow divider and a lower forward flow divider is disposed within the annular inlet. A first and second radially spaced annular flow divider is adapted for directing said flow of air into at least a first, second, third and fourth flow passageway. At least four curved flow splitters are utilized for separating particles and/or materials entrained in the flow of air as it passes through the first, second, third and fourth flow passageways.

21 Claims, 3 Drawing Sheets

U.S. PATENT DOCUMENTS

| | | |
|---|---|---|
| 4,591,312 A | 5/1986 | Wenglarz |
| 4,592,765 A | 6/1986 | Breitman et al. |
| 4,617,028 A | 10/1986 | Ray et al. |
| 4,685,942 A | 8/1987 | Klassen et al. |
| 4,702,071 A | 10/1987 | Jenkins et al. |
| 4,704,145 A * | 11/1987 | Norris et al. .................. 55/306 |
| 4,928,480 A * | 5/1990 | Oliver et al. ............ 60/39.092 |
| 5,039,317 A | 8/1991 | Thompson et al. |
| 5,139,545 A | 8/1992 | Mann |
| 5,222,693 A | 6/1993 | Slutzkin et al. |
| 5,268,011 A | 12/1993 | Wurz |
| 5,320,651 A | 6/1994 | Drummond |
| 5,746,789 A | 5/1998 | Wright et al. |
| 5,827,043 A | 10/1998 | Fukuda et al. |
| 6,129,509 A | 10/2000 | Cousin et al. |
| 6,134,874 A | 10/2000 | Stoten |
| 6,499,285 B1 * | 12/2002 | Snyder .................... 60/39.092 |
| 6,508,052 B1 * | 1/2003 | Snyder et al. ........... 60/39.092 |
| 6,698,180 B2 * | 3/2004 | Snyder .................... 60/39.092 |
| 2005/0166571 A1 | 8/2005 | Marinella Pavlatos |

* cited by examiner

PARTICLE SEPARATOR FOR A GAS TURBINE ENGINE

CROSS-REFERENCE TO RELATED APPLICATIONS

The present application is a continuation of PCT Patent Application No. PCT/US2006/024055 filed Jun. 20, 2006, which claims the benefit of U.S. Provisional Patent Application No. 60/692,430, filed Jun. 20, 2005, each of which is incorporated herein by reference.

GOVERNMENT RIGHTS

The present inventions were made with U.S. Government support under contract number DAAH10-00-2-0007. The U.S. Government has certain rights in the present inventions.

BACKGROUND

The present invention relates generally to particle separators and more particularly, but not exclusively, to inertial particle separators for application with gas turbine engines.

Particle separators are operable to separate undesirable materials from air entering a turbine engine. Such undesirable materials may adversely affect the internal working components of the gas turbine engine if they were allowed to enter the engine. Presently, many particle separator designs have a variety of shortcomings, drawbacks and disadvantages. Accordingly, there is a need for the unique and inventive particle separators according to the present invention.

SUMMARY

One embodiment according to the present invention is a unique particle separator for a gas turbine engine. Other embodiments include unique apparatuses, systems, devices, hardware, methods, and combinations of these for particle separation in gas turbine engines. Further embodiments, forms, objects, features, advantages, aspects, and benefits of the present invention shall become apparent from the following description and drawings.

DETAILED DESCRIPTION OF THE ILLUSTRATIVE EMBODIMENTS

Figure 1:
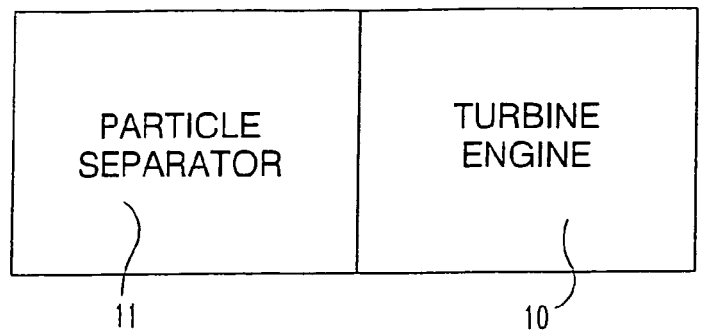
FIG. 1 is a block diagram depicting a gas turbine engine with a particle separator operatively coupled thereto.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

With reference to FIG. 1, there is illustrated a block diagram depicting a gas turbine engine 10 with an inertial particle separator 11 operatively coupled thereto. The particle separator 11 is arranged to separate matter, such as but not limited to, sand, dust, dirt, liquids, and/or any particulate matter, all of which are referred to as particles, from the air that passes through the particle separator 11 to an inlet of the gas turbine engine 10. In one form, the particle separator 11 is incorporated into an aircraft. The term aircraft includes, but is not limited to, helicopters, airplanes, unmanned space vehicles, fixed wing vehicles, variable wing vehicles, and others. Furthermore, the present inventions are contemplated for use for utilization in connection with other applications that may not be coupled with an aircraft such as, for example, industrial applications, power generation, naval propulsion, pumping sets, hover crafts, vehicles and other applications as would occur to one of ordinary skill in the art.

Figure 2:
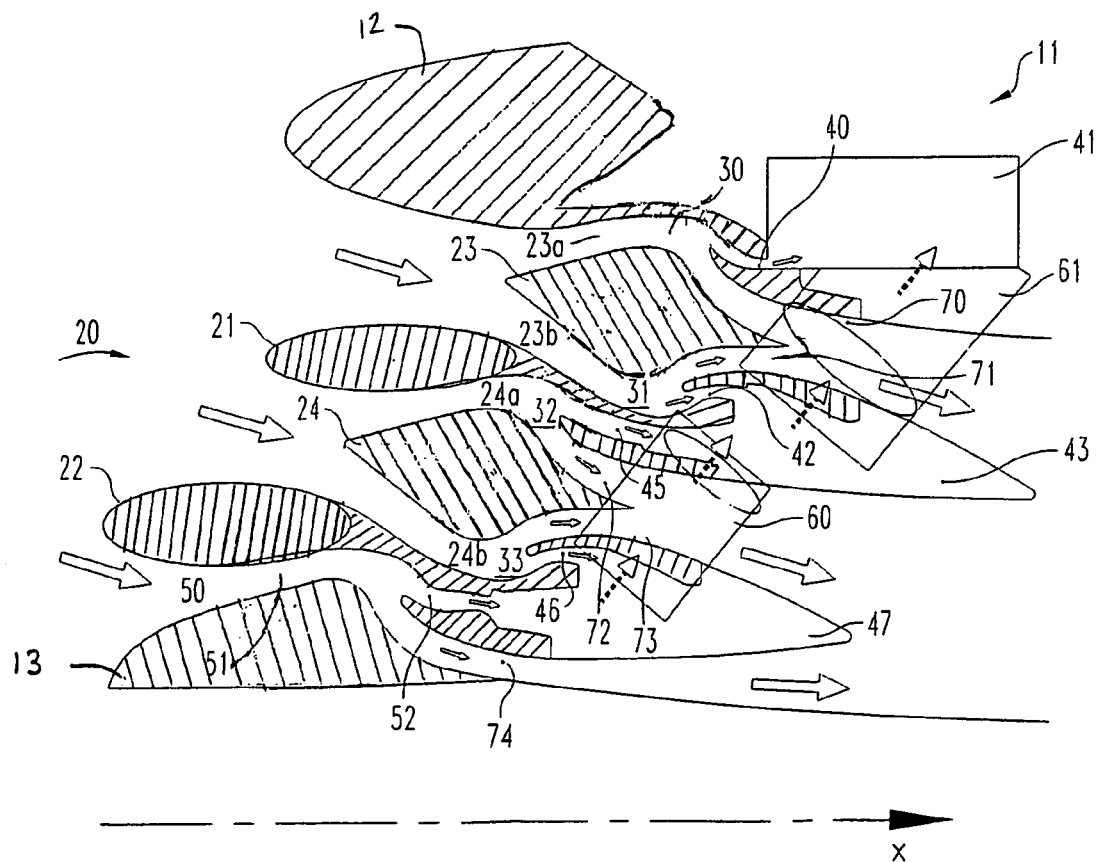
FIG. 2 is a partial cross-sectional view of one embodiment of a particle separator for use in connection with a gas turbine engine.

With reference to FIG. 2, there is set forth an illustrative partial sectional view of one embodiment of the particle separator 11. In one form, the particle separator 11 is symmetrical about the centerline X. Particle separator 11 may be symmetrical about an engine centerline (not illustrated) or may be radially offset therefrom. The particle separator 11 has an inlet 20 extending around the particle separator 11 and is adapted to allow the passage of air therein. The inflow of air entering the inlet 20 may include other materials or contaminants such as, but not limited to, sand, dirt, dust, liquids, foreign objects and/or any other particulate matter. Inlet 20 may take on a variety of cross sectional shapes and configurations, for example, annular, polygonal, circular, oval, parabolic, tear or eye shaped, and a variety of other configurations, including those which are partially, substantially, essentially, approximately, or nearly in conformance with the foregoing, and also including combinations and blends of the foregoing.

In one form of the present invention, the flow of air passing through the inlet 20 and into the particle separator 11 is divided into five fluid flows 23a, 23b, 24a, 24b and 51 that are radially spaced apart or radially stacked flows. However, the present application contemplates the division of the inlet 20 into other number of fluid flows. The airflow entering through the inlet 20 may be divided by two flow dividers 21, 22 that are positioned between an outer member/shroud 12 and an inner member/shroud 13. Flow dividers 21, 22 in one embodiment have a substantially annular and substantially blunt configuration, but can have a variety of other cross-sectional configurations and shapes such as those mentioned above.

The airflow continues from the flow dividers 21, 22 and is separated by internal flow divider 23 into an outer flow stream 23a and an inner flow stream 23b; and by internal flow divider 24 into an outer flow stream 24a and an inner flow stream 24b and an outer flow stream 51 coming off of flow divider 22. Flow streams 23a, 23b, 24a, 24b and 51 pass through flow pathways 30, 31, 32, 33 and 50 respectively. In one form the five flow pathways are relatively tightly clustered in a radial direction. The flow pathways 30, 31, 32, 33 and 50 are preferably annular but can be of a variety of other shapes and configurations such as those mentioned above. In the illustrated embodiment, flow pathways 30, 31, 32, 33 and 50 each include a branched portion that facilitates the separation of materials and/or particles from the respective air flow stream. The present application further contemplates alternate embodiments including additional flow dividers, additional internal flow dividers and additional scavenge conduits/accumulators as needed for a particular particle separator. Further, the present application contemplates the utilization of one flow divider and one internal flow divider.

The inertia of the materials and/or particles in flow stream 23a tends to cause the particles and/or materials to flow through an opening 40 in an outer scavenge conduit/accumulator 41. Outer scavenge conduit/accumulator 41 extends around the particle separator 11 and is adapted for receiving particles and/or materials from the airflow within the particle separator 11. The inertia of the materials and/or particles in the flow stream 23b tends to cause the particles and/or materials to flow through an upper opening 42 of an intermediate inner scavenge conduit/accumulator 43. The intermediate inner scavenge conduit/accumulator 43 extends around the particle separator 11 and is also adapted for receiving particles and/or materials from the airflow within the particle separator 11.

The inertia of the materials and/or particles in the flow stream 24a tends to cause the particles and/or materials to flow through a lower opening 45 of the intermediate inner scavenge conduit/accumulator 43. The inertia of the materials and/or particles in the flow stream 24b tends to cause the particles and/or materials to flow through an upper opening 46 of an inner scavenge conduit/accumulator 47. The inner scavenge conduit/accumulator 47 extends around the particle separator 11 and is adapted for receiving particles and/or materials from the airflow within the particle separator 11. A portion of the airflow divided by flow divider 22 results in the routing of a portion of the flow stream 51 through flow pathway 50. The inertia of the materials and/or particles in the flow stream 51 tends to cause the particles and/or materials to flow through a lower opening 52 of the inner scavenge conduit/accumulator 47.

The particles and/or materials separated from the airflow passing to the inlet of the gas turbine engine 10 are referred to herein as scavenged air. The scavenged air passing through openings 42, 45 is received within the intermediate inner scavenge conduit/accumulator 43. The scavenged air passing through openings 46, 52 is received within the inner scavenge conduit/accumulator 47. The scavenged air passing through opening 40 is received within the outer scavenge conduit/accumulator 41.

In one form, a plurality of circumferentially spaced struts 60, 61 provide a flow path for conveyance of the scavenged air from the inner scavenge conduits/accumulators 43, 47 to the outer scavenge conduit/accumulator 41. In one form, strut 60 extends between inner scavenge conduit/accumulator 47 and inner intermediate scavenge conduit/accumulator 43 and a second strut 61 extends between inner scavenge conduit/accumulator 43 and outer scavenge conduit/accumulator 41. The scavenged air is conveyed to outer scavenge conduit/accumulator 41 and then ducted away from the particle separator 11 and gas turbine engine 10. In one embodiment the scavenge conduits/accumulators 41, 43 and 47 are annular. The struts 60 and/or 61 may also be utilized to locate and/or support the various structures that they connect. In one example the struts provide a material flow path and also locate and support the various scavenge conduits/accumulators within the particle separator. The mechanical properties of the struts are utilized to enhance the mechanical integrity of portions of the particle separator.

The cleansed airflow is discharged through passages 70, 71, 72, 73, 74 to the inlet of the gas turbine engine 10. The reader will understand that clean and/or cleansed is a relative term and that air flow passing through passages 70, 71, 72, 73 and 74 may contain some contaminants and/or particulate matter. The present inventions allow the creation of a particle separator 11 having further compactness that is capable of removing a higher amount of particles from the airflow entering the inlet 20. Further, the ability to radially stack additional narrower flow paths increases the efficiency of removing particles and/or materials from the airflow. In one form the radial stacking of additional flow paths for particle separation increases the separator efficiency for finer dust/particles.

Particles entering flow pathway 30 tend to encounter the radially outer surface of that flowpath, and due to a tendency to avoid changes in direction, tend to travel along that surface resulting in their being scavenged as described above. Particles entering flow pathway 31 tend to encounter the radially inner surface of that flowpath, and due to a tendency to avoid changes in direction, tend to travel along that surface resulting in their being scavenged as described above. Particles entering flow pathway 32 tend to encounter the radially outer surface of that flowpath, and due to a tendency to avoid changes in direction, tend to travel along that surface resulting in their being scavenged as described above. Particles entering flow pathway 33 tend to encounter the radially inner surface of that flowpath, and due to a tendency to avoid changes in direction, tend to travel along that surface resulting in their being scavenged as described above. Particles entering flow pathway 50 tend to encounter the radially inner surface of that flowpath, and due to a tendency to avoid changes in direction, tend to travel along that surface resulting in their being scavenged as described above. Let it be understood, however, that the illustrated embodiment is only one example according to the present invention.

Figure 3:
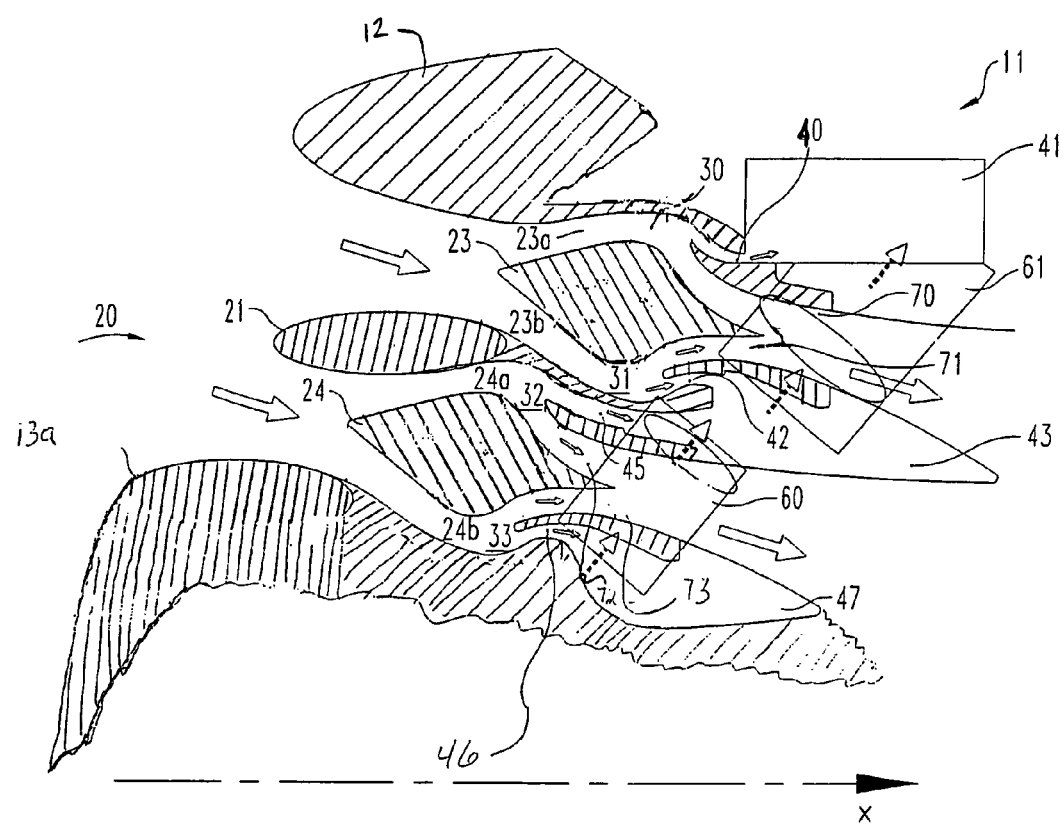
FIG. 3 is a partial cross-sectional view of one embodiment of a particle separator for use in connection with a gas turbine engine.

With reference to FIG. 3, there is shown an illustrative partial sectional view of one embodiment of a particle separator 11. Elements of FIG. 3 which are the same as or similar to those shown and described in connection with FIG. 2 are labeled with like reference numerals. As illustrated in FIG. 3, a single flow divider 21 divides air into two flows. Center body 13a occupies a part of or all of the space which flow divider 22 and its associated downstream structure would otherwise occupy in the embodiment of FIG. 2. The resulting particle separator 11 removes the flow pathway 5, the opening 52 into scavenge conduit/accumulator 47 and the cleansed airflow passage 74.

Figure 4:
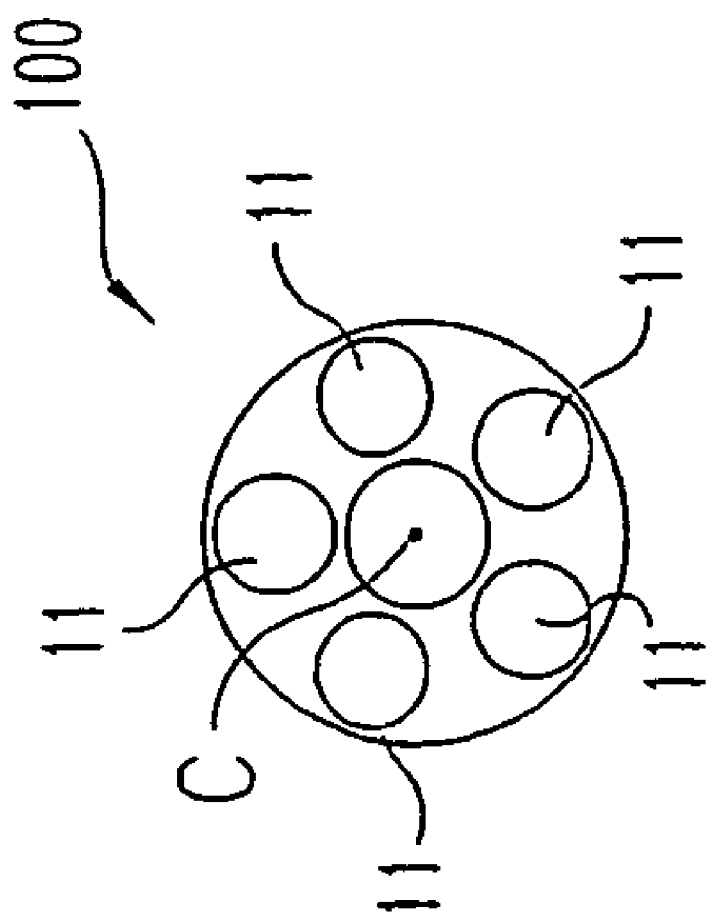
FIG. 4 is a schematic end view of a plurality of inlet particle separators.

With reference to FIG. 4, there is illustrated a schematic end view of an inlet particle unit 100 including a plurality of inlet particle separators 11. In one form the inlet particle unit 100 is placed around the front annulus of a gas turbine engine compressor. In one form there are five inlet particle separators 11 located around the centerline of the compressor shaft C. However, the present invention contemplates that the particle separator may be used singularly or in a clustered manner. The quantity of particle separators clustered in the inlet particle unit can vary based upon many factors including the need, operating environment and/or size of the gas turbine engine.

The present invention contemplates that the particle separator may have more than five flowpaths and related structures for the passage of the separated fluid flow. More specifically, the present application contemplates embodiments that include the addition of additional structures and flowpaths spaced radially from the current structures. A non-limiting example would be to introduce into the embodiment set forth in FIG. 2 another set of structures including internal flow divider 24, flow divider 21 and scavenger conduit/accumulator 43. The set may be ordered as in the prior description and replicated numerous times within the particle separator. The sets of structure can be utilized to replicate the flow separating structure any number of times as needed and as limited by the mechanical space within the particle separator. Further, one alternate embodiment of the present invention further contemplates the selecting of components from internal flow divider 24, flow divider 21 and scavenger conduit/accumulator 43 that are not used in sets.

One form of the present invention contemplates an apparatus, comprising: a gas turbine engine having an engine inlet; and an inertial particle separator in flow communication with said engine inlet, said particle separator including a first, second, third, and fourth annular separation passageway, said annular separation passageways being spaced radially from one another. Another form of the present invention contemplates the apparatus and further comprises an intermediate scavenge conduit/accumulator adapted for receiving materials separated from a portion of an airflow passing within said particle separator, and wherein two of said annular separation passageways are in flow communication with said intermediate scavenge conduit/accumulator. Another form of the present invention contemplates the apparatus and further comprises an outer scavenge conduit/accumulator adapted to receive materials separated from an airflow passing through said particle separator, an intermediate scavenge conduit/accumulator adapted to receive materials separated from the airflow passing through said particle separator; and an inner scavenge conduit/accumulator adapted to receive materials separated from the airflow passing through said particle separator. Another form of the present invention contemplates the apparatus and further comprises an outer scavenge conduit/accumulator adapted to receive materials separated from an airflow passing through said particle separator, an intermediate scavenge conduit/accumulator adapted to receive materials separated from the airflow passing through said particle separator; and an inner scavenge conduit/accumulator adapted to receive materials separated from the airflow passing through said particle separator and at least one passageway coupled between said outer scavenge conduit/accumulator, said intermediate scavenge conduit/accumulator, and said inner scavenge conduit/accumulator, wherein said at least one passageway defines a flow path for material separated from the airflow. Yet another form of the present invention contemplates the apparatus and further comprises an outer scavenge conduit/accumulator adapted to receive materials separated from an airflow passing through said particle separator, an intermediate scavenge conduit/accumulator adapted to receive materials separated from the airflow passing through said particle separator; and an inner scavenge conduit/accumulator adapted to receive materials separated from the airflow passing through said particle separator and at least one passageway coupled between said outer scavenge conduit/accumulator, said intermediate scavenge conduit/accumulator, and said inner scavenge conduit/accumulator, wherein said at least one passageway defines a flow path for material separated from the airflow and at least one passageway defines a plurality of passageways coupled between said outer scavenge conduit/accumulator, said intermediate scavenge conduit/accumulator, and said inner scavenge conduit/accumulator, wherein each of said plurality of annular separation passageways defines a flow path for material separated from said airflow. Another form of the present invention contemplates the apparatus and further comprises means for removing materials from an airflow passing through at least one of said annular separation passageways. Another form of the present invention contemplates the apparatus and further comprises means for removing materials from an airflow passing through said annular separation passageways.

One form of the present invention contemplates a combination comprising: a gas turbine engine having a air inlet; a particle separator for separating particles and/or materials entrained in a flow of air, said particle separator comprising: an annular inlet defined by an outer member and an inner member; a first annular flow divider disposed within said annular inlet; a second annular flow divider disposed within said annular inlet, wherein said first annular flow divider has a diameter larger than the diameter of said second annular flow divider; a first annular flow separator having a diameter larger the diameter of said first annular flow divider and being adapted for dividing the flow of air from said first annular flow divider into a first flow passageway and a second flow passageway; a second annular flow separator having a diameter smaller than said first annular flow separator and larger than the diameter of said second annular flow divider diameter and being adapted for further dividing said flow of air from at least one of said annular flow dividers into a third flow passageway and a fourth flow passageway; and, at least four curved flow splitters for separating particles and/or materials entrained in the flow of air as it passes through said first, second, third and fourth flow passageways. Another form of the present invention contemplates the combination and further comprising an outer scavenge conduit/accumulator, an intermediate scavenge conduit/accumulator, and an inner scavenge conduit/accumulator, each of said scavenge conduits/accumulators disposed in flow communication with at least one of said flow passageways. Another form of the present invention contemplates the combination and further comprising an outer scavenge conduit/accumulator, an intermediate scavenge conduit/accumulator, and an inner scavenge conduit/accumulator, each of said scavenge conduits/accumulators disposed in flow communication with at least one of said flow passageways and wherein said intermediate scavenge conduit/accumulator is positioned to receive particles and/or material from at least two of said four flow splitters. Yet another form of the present invention contemplates the combination and further comprising a fifth curved flow splitter for separating particles and/or materials entrained in said flow of air into a fifth flow passageway, wherein said fifth flow passageway having the smallest diameter of said flow passageways. Yet another form of the present invention contemplates the combination and further comprising a fifth curved flow splitter for separating particles and/or materials entrained in said flow of air into a fifth flow passageway, wherein said fifth flow passageway having the smallest diameter of said flow passageways and further comprising an outer scavenge conduit/accumulator, an intermediate scavenge conduit/accumulator, and an inner scavenge conduit/accumulator; each of said scavenge conduits/accumulators disposed in flow communication with at least one of said flow passageways; and wherein said inner scavenge conduit/accumulator is positioned to receive particles and/or material from said fourth flow splitter and said fifth flow splitter. Another form of the present invention contemplates the combination and further comprising an outer scavenge conduit/accumulator, an intermediate scavenge conduit/accumulator, and an inner scavenge conduit/accumulator, each of said scavenge conduits/accumulators disposed in flow communication with at least one of said flow passageways and further comprising a material flow path connected with said outer, intermediate, and inner conduits/accumulators for conveying the separated material from said inner scavenge conduit/accumulator and said intermediate scavenge conduit/accumulator to said outer scavenge conduit/accumulator. In yet another form of the present invention the combination further comprising an outer scavenge conduit/accumulator, an intermediate scavenge conduit/accumulator, and an inner scavenge conduit/accumulator, wherein said inner scavenge conduit/accumulator and said intermediate scavenge conduit/accumulator are each positioned to receive material from two of said flow splitters; and further comprising a material flow path connected with said outer, intermediate, and inner conduits/accumulators for conveyance of the separated material from said inner scavenge conduit/accumulator and said intermediate scavenge conduit/accumulator to said outer scavenge conduit/accumulator.

One form of the present invention contemplates a particle separator, comprising: an annular air inlet for receiving an airflow; means for dividing said airflow into at least four radially spaced flow paths; means for separating particles contained in said airflow flowing through said at least four flow paths; and means for directing particles out of said particle separator. Yet another form of the present invention contemplates the particle separator wherein said means for dividing said airflow into at least four flow paths includes a first annular flow divider and a second annular flow divider. In yet another form of the present invention the particle separator contemplates that said means for separating particles contained in said airflow flowing through said at least four flow paths comprises an outer scavenge conduit/accumulator, an intermediate scavenge conduit/accumulator, and an inner scavenge conduit/accumulator. Another form of the present invention contemplates that the particle separator is further defined by said means for directing includes a plurality of struts connected with an outer scavenge conduit/accumulator, an intermediate scavenge conduit/accumulator, and an inner scavenge conduit/accumulator.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus, comprising:
  a gas turbine engine having an engine inlet;
  an inertial particle separator in flow communication with said engine inlet, said particle separator including a first, second, third, and fourth annular separation passageway, said annular separation passageways being spaced radially from one another;
  an outer accumulator, an intermediate accumulator, and an inner accumulator, each of said outer, intermediate, and inner accumulators being configured to receive materials separated from an airflow passing through said particle separator; and
  at least one flow connector fluidly coupling said intermediate and inner accumulators to said outer accumulator, wherein said at least one flow connector defines a flow path for at least a portion of the materials separated from the airflow.

2. A combination comprising:
  a gas turbine engine having a air inlet;
  a particle separator for separating particles and/or materials entrained in a flow of air, said particle separator comprising:
  an annular inlet defined by an outer member and an inner member;
  a first annular flow divider disposed within said annular inlet;
  a second annular flow divider disposed within said annular inlet, wherein said first annular flow divider has a diameter larger than the diameter of said second annular flow divider;
  a first annular flow separator having a diameter larger the diameter of said first annular flow divider and being adapted for dividing the flow of air from said first annular flow divider into a first flow passageway and a second flow passageway;
  a second annular flow separator having a diameter smaller than said first annular flow separator and larger than the diameter of said second annular flow divider diameter and being adapted for further dividing said flow of air from at least one of said annular flow dividers into a third flow passageway and a fourth flow passageway; and
  at least four curved flow splitters for separating particles and/or materials entrained in the flow of air as it passes through said first, second, third and fourth flow passageways.

3. The particle separator of claim 2, further comprising an outer scavenge conduit, an intermediate scavenge conduit, and an inner scavenge conduit, each of said scavenge conduits disposed in flow communication with at least one of said flow passageways.

4. The particle separator of claim 3, wherein said intermediate scavenge conduit is positioned to receive particles and/or material from at least two of said four flow splitters.

5. The particle separator of claim 2, further comprising a fifth curved flow splitter for separating particles and/or materials entrained in said flow of air into a fifth flow passageway, wherein said fifth flow passageway having the smallest diameter of said flow passageways.

6. The particle separator of claim 5, further comprising an outer scavenge conduit, an intermediate scavenge conduit, and an inner scavenge conduit;
  each of said scavenge conduits disposed in flow communication with at least one of said flow passageways; and
  wherein said inner scavenge conduit is positioned to receive particles and/or material from said fourth flow splitter and said fifth flow splitter.

7. The particle separator of claim 3, further comprising a material flow path connected with said outer, intermediate, and inner conduits for conveying the separated material from said inner scavenge conduit and said intermediate scavenge conduit to said outer scavenge conduit.

8. The particle separator of claim 2, further comprising an outer scavenge conduit, an intermediate scavenge conduit, and an inner scavenge conduit, wherein said inner scavenge conduit and said intermediate scavenge conduit are each positioned to receive material from two of said flow splitters; and further comprising a material flow path connected with said outer, intermediate, and inner conduits for conveyance of the separated material from said inner scavenge conduit and said intermediate scavenge conduit to said outer scavenge conduit.

9. A particle separator, comprising:
an annular air inlet for receiving an airflow;
a first annular flow separator being adapted for dividing the airflow into at least a first flow path and a second flow path;
a second annular flow separator having a diameter smaller than said first annular flow separator and being adapted for dividing said airflow into at least a third flow path and a fourth flow path;
means for separating particles contained in said airflow flowing through said at least four flow paths; and
means for directing particles out of said particle separator.

10. The particle separator of claim 9, wherein said means for separating particles contained in said airflow flowing through said at least four flow paths comprises an outer scavenge conduit, an intermediate scavenge conduit, and an inner scavenge conduit.

11. The particle separator of claim 9, wherein said means for directing includes a plurality of struts connected with an outer scavenge conduit, an intermediate scavenge conduit, and an inner scavenge conduit.

12. The apparatus of claim 1, wherein the particle separator includes a fifth annular separation passageway.

13. The apparatus of claim 1, wherein two of the annular separation passageways are in flow communication with the intermediate accumulator.

14. The apparatus of claim 1, wherein the at least one flow connector defines a plurality of flow connectors fluidly coupling both the intermediate accumulator and the inner accumulator to the outer accumulator.

15. The apparatus of claim 1, wherein the at least one flow connector includes a first strut and a second strut, wherein the first strut extends between the inner accumulator and the intermediate accumulator and the second strut extends between the intermediate accumulator and the outer accumulator.

16. The particle separator of claim 9, further comprising:
a first annular flow divider disposed within the annular air inlet; and
a second annular flow divider disposed within the annular air inlet, wherein the first annular flow divider has a diameter larger than the diameter of the second annular flow divider;
wherein the first annular flow separator has a diameter larger the diameter of the first annular flow divider and the second annular flow separator has a diameter smaller than the first annular flow separator and larger than the diameter of the second annular flow divider diameter.

17. An apparatus, comprising:
a gas turbine engine having an engine inlet;
an inertial particle separator in flow communication with the engine inlet, the particle separator including at least four substantially annular separation passageways, the annular separation passageways being spaced radially from one another; and
a plurality of radially spaced particle accumulators operable to receive materials separated from an airflow passing through the annular separation passageways;
wherein at least one of the plurality of radially spaced accumulators is in fluid communication with two of the passageways.

18. The apparatus of claim 17, wherein the particle separator includes five annular separation passageways.

19. The apparatus of claim 17, wherein the particle separator includes a first flow separator defining at least two annular separation passageways and a second flow separator defining at least two annular separation passageways.

20. The apparatus of claim 19, wherein the particle separator further includes an annular flow divider disposed operable to divide the airflow into a first and second flow path.

21. The apparatus of claim 20, wherein the particle separator further includes a second annular flow divider operable to divide the airflow into a third and fourth flow path, wherein the first annular flow divider has a diameter larger than the diameter of the second annular flow divider; and
wherein the first annular flow separator has a diameter larger the diameter of the first annular flow divider and the second annular flow separator has a diameter smaller than the first annular flow separator and larger than the diameter of the second annular flow divider diameter.

* * * * *